United States Patent Office 3,523,401
Patented Aug. 11, 1970

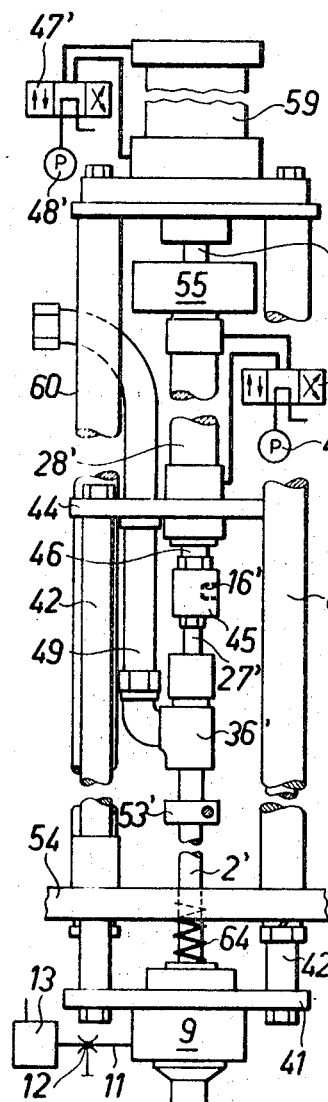
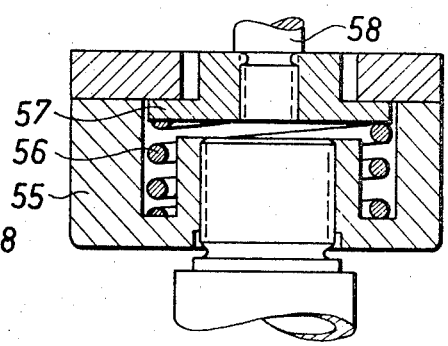
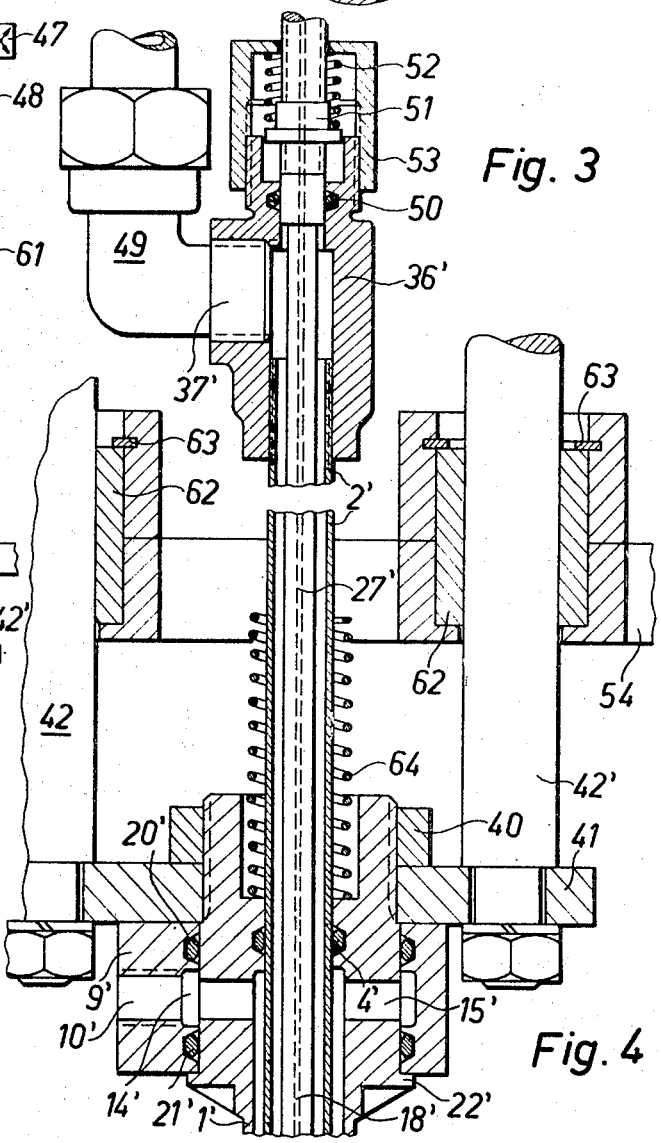
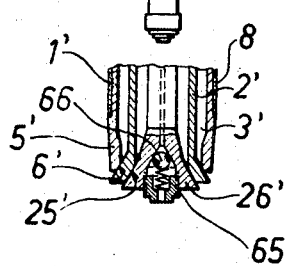
Fig. 1  Fig. 2  Fig. 3  Fig. 4  Fig. 5

3,523,401
FILLING APPARATUS FOR CONTAINERS OF THERMOPLASTIC MATERIAL
Gerhard Hansen, Hofener Str. 47,
7013 Oeffingen, Germany
Filed Feb. 2, 1966, Ser. No. 524,564
Claims priority, application Germany, Feb. 6, 1965,
H 55,085
Int. Cl. B65b 47/02
U.S. Cl. 53—141                                                 7 Claims

ABSTRACT OF THE DISCLOSURE

A filling device for a container composed of a thermoplastic synthetic substance having a filling tube and an outside tube operable by an operating cylinder. A stop element is provided so that the filling tube and the outside tube may be extended relative to one another and a spring is associated with the filling tube to lift off the latter from a closing element.

---

The present invention relates to an apparatus for filling a tubular container consisting of a thermoplastic material such as polyethylene or the like, and it is an object of the invention to provide such a filling apparatus which comprises a pair of tubes which are disposed within each other and define a filling channel and a vent channel and are slidable in the axial direction relative to each other, and a pair of valves which are connected to or at least partly formed by these tubes for opening and closing these channels.

Another object of the invention is to provide an apparatus of the above-mentioned type which is of a very simple construction and may be very easily operated.

Another object of the invention is to provide single means for moving only one valve member of at least two valves and for thereby operating these valves in a certain timed relation to each other so as to open and close at least two channels.

According to the invention, these objects are attained by providing a valve member which is at least partly disposed within the inner tube near the lower end thereof and is movable therein in the axial direction so as to open and close the filling channel, and by providing suitable connecting means on the valve member which are adapted when the valve member is operated to transmit its movement with a certain delay to the inner tube which is thereby also moved so as to open or close the second valve which is formed on or by the lower ends of the inner and outer tubes and thus to open and close the vent channel which is formed between these tubes.

Another object of the invention is to provide suitable means for first lowering the entire unit consisting of the outer and inner tubes together with the valve member and the mentioned connecting means so as to connect the lower end of the outer tube to the upper end of the plastic container to be filled, for then moving the inner tube together with the valve member and connecting means relative to the outer tube so as to open the valve controlling the vent channel, for then lowering the inner tube together with the valve member toward the bottom of the plastic container and then opening the valve member so that during the following filling operation the material will drop into the container with the least possible impact so as to prevent as much as possible a turbulence of the material and mixing thereof with air as well as a possible foaming of the material within the container. The above-mentioned means further serve for then gradually lifting the inner tube together with the opened valve member while the filling operating continues and preferably in accordance with the rising level of the material within the container until the latter contains the prescribed amount of material, and for finally lifting the entire unit so as to withdraw the outer tube from the mouth of the container and to permit the latter thereafter to be closed and sealed.

The mentioned connecting means according to the invention which are provided between the valve member and the inner tube for effecting a time lag between the movements of these elements may be of different designs, for example, in the form of a compression spring or a member of a resilient material which is disposed between the valve stem and the inner tube, or in the form of a member which forms an abutment on the valve stem and is spaced at a certain distance from an abutment on the inner tube and is adapted to engage therewith after the valve stem has been moved accordingly. These connecting means are preferably adjustable so as to permit the time lag between the operation of the two valves to be varied. By the provision of very simple means, it is also possible to adjust the apparatus so that the outer vent valve will open prior to the inner filling valve.

Another feature of the invention consists in providing a gas channel within the tubes and independent of the filling and vent valves and channels for supplying a gas, for example, air, under pressure into the tubular plastic container for expanding the same so as to engage with the surrounding wall of the extrusion mold and to acquire the shape as predetermined by the mold. The gas which is then supplied through this channel into the plastic container may then be discharged therefrom during the operation of filling the container by passing through the vent valve which is formed by the ends of the outer and inner tubes. The provision of two separate channels for supplying the gas into the plastic container and for discharging it therefrom is particularly of advantage in those cases in which the material to be filled into the container has a tendency to foam during the filling operation. Such a foam would then pass together with the exhausted gas into the vent channel. If, however, this vent channel would also serve for supplying the gas into the plastic container and additional gas is then fed into the latter, the droplets of the material which are formed by the foam might be carried along and be deposited on the wall of the container which would thereby be cooled prematurely. The parts of the container wall which are thus cooled will then no longer be able to stretch to the same extent as the other parts so that, when the plastic of the filled container has finally set, these prematurely cooled parts will be thicker than the other parts. This disadvantage will be eliminated if two separate channels are provided for supplying the gas into the container and for discharging it therefrom since the gas will then flow through both channels in only one direction. The material which is taken along by the discharged gas is then preferably collected in a suitable container and may subsequently be returned to the supply tank of the material.

Another feature of the invention consists in providing a check valve in or on the lower end of the mentioned gas channel which opens in the downward direction and prevents any return flow of the gas and also the entry of any material from the container into this channel during the filling operation. This gas channel may therefore be made very thin without danger that it may be clogged by the entry of any material.

The means for lowering and lifting the inner tube together with the valve stem and the valve member thereon independently of the outer tube may be of any suitable design and may consist, for example, of a hydraulic or pneumatic cylinder-and-piston unit. According to one preferred embodiment of the invention, one part of this unit may be directly connected to the valve stem. The mentioned connecting means may then comprise, for example, a compression spring which is interposed between the valve stem and a part of the inner tube and tends to lift the inner tube and thus the lower edge thereof off the valve member and thereby tends to close the vent valve which is formed between the lower ends of the inner and outer tubes. This compression spring should be designed so as to maintain the filling valve in the open position until the prescribed amount of material has been filled into the plastic container and the filling line is no longer under pressure.

The above-mentioned as well as further features and advantages of the present invention will become more clearly apparent from the following detailed description thereof which is to be read with reference to the accompanying drawings, in which—

FIG. 1 is a side elevation, partly broken away, showing the filling apparatus according to the invention;

FIGS. 2 to 5 are sectional views of which;

FIG. 2 is a sectional view of the spring housing;

FIG. 3 is a vertical section of the filling line;

FIG. 4 is a vertical section of the tube and connecting part, and

FIG. 5 is a sectional view of the nozzle stem valve end.

As illustrated in the drawings, the filling apparatus according to the invention comprises an outer tube 1' in which an inner tube 2' is mounted so as to be slidable therein in the axial direction. These two tubes 1' and 2' define an annular vent channel 3' which is closed at its upper end by a sealing ring 4' and at its lower end by a vent valve which is formed by an inwardly projecting flange 5' on the lower end of the outer tube 1' and a conical surface 6' on the lower end of the inner tube 2'. The inner tube 2' may be centrally guided within the outer tube 1' by means of ribs on one tube or the other. The outer tube 1' may be provided above the flange 5' with a heat-insulating coating 8 in order to prevent the thermoplastic container, which is to be filled, and into the mouth of which the lower end 5' of the outer tube 1' is to be inserted, from being cooled prematurely.

The enlarged upper end of the outer tube 1' has mounted thereon a connecting part or element 9' which is preferably adapted to be turned in different directions and is provided with a channel 10' and an inner screw thread for connecting thereto a vent pipe 11, as indicated diagrammatically in FIG. 1, which leads via an adjustable throttling device 12 to a container 13. In place of the throttling device 12, it is also possible to provide a pressure relief valve. The container 13 serves for collecting the material which is taken along by the gas or air which is exhausted from the plastic container during the filling operation and is passed through the vent pipe 11. Channel 10' terminates into an annular channel 14' which is connected by bores 15' with the gas channel 3' and is sealed at both ends toward the outside by sealing rings 20' and 21'. The connecting part 9' is supported by a flange 22' on the outer tube 1' and it is secured in a fixed position in its axial direction by a nut 40 which is screwed upon the upper end of the outer tube 1'. This nut 40 also serves for securing the outer tube 1' to a crossbar 41.

The lower end of the inner tube 2' is provided with an inner conical valve seat 25' which is operatively associated with a conical valve member or closing element 26' on the lower end of a valve stem 27' which extends through the inner tube 2' and is connected by a connecting member 45 to a piston rod 46, the piston of which is movable within a cylinder 28'. This cylinder is provided on both ends with connecting lines which lead to a control unit 47 which either separates a source of pressure, for example, in the form of an air pump 48, from the cylinder 28' or connects one of the ends of cylinder 28' with the air pump 48 so that the piston will be moved back and forth in cylinder 28'.

The upper end of the inner tube 2' carries a filling part 36' which is provided with a connection 37' for a filling line 49 which is connected to the inside of the inner tube 2'. Valve stem 27' which is provided with a central bore 18' forming a gas supply channel is slidably mounted in the upper end of the filling part 36', and the inner tube 2' is sealed in the upward direction by a sealing ring 50. Valve stem 27' carries a spring collar 51 which is screwed thereon and supports the lower end of a compression spring 52, the upper end of which acts upon a sleeve 53 which is screwed upon the filling part 36'.

Underneath the filling part 36', a stop member 53' is mounted on the inner tube 2' so as to be adjustable to different levels thereon. This stop collar 53' is operatively associated with a spring 64.

On its upper end, cylinder 28' carries a spring housing 55 in which a compensating spring 56 is mounted which acts at one end upon the bottom of the spring housing 55 and at the other end upon a pressure plate 57 which is slidable within the spring housing 55 and secured to the lower end of a piston rod 58 in a cylinder 59. This cylinder 59 is secured by means of spacing bolts 60 and 61 to the bottom plate 54 which carries a slide bearing 62 for each of the spacing bolts 42 and 42'. Each of these slide bearings 62 is maintained in a fixed position by a spring washer 63. Cylinder 59 is connected like the other cylinder 43 via a control unit 47' to a pump 48'. If desired, it is possible to replace each of these cylinders 28' and 59 by an electromagnet, an electric motor, a hydraulically operated working cylinder, or by similar means.

Within the lower end of valve stem 27' a check valve is provided which normally closes the bore 18' in shaft 27' and is adapted to open in the downward direction. This check valve may consist of a valve spring 65 and a valve ball 66, although it may also be of any other suitable construction.

In the operation of the filling apparatus according to the invention, the entire unit comprising the outer and inner tubes 1' and 2', the valve stem 27' and valve member 26' thereon and the other elements which are movable therewith is disposed at or lowered to a certain position above a tubular container of a thermoplastic material which is still in a plastic and stretchable condition and disposed within an extrusion mold in which it has previously been formed and in which its lower end has already been tightly closed. By the operation of the piston rod 58, the lower end of the outer tube 1' is inserted into the upper end of the plastic container so that this end will be located adjacent to the heat-insulating coating 8 on tube 1' and be closed tightly. The outer tube 1' will be held in this position under the pressure of the compensating spring 56. Since the piston is moved downwardly in cylinder 59 to a fixed stop, the compensating spring 56 will serve for compensating any possible differences in length which may occur between cylinder 59 and the mouth of the plastic container into which the lower end of the outer tube is inserted.

Compressed air is then passed from a suitable source through the connection 16' and the central channel 18' in valve stem 27' into the plastic container which is thereby expanded and applied against the surrounding wall of the mold so as to acquire the shape as predetermined by the mold. Piston rod 46 is then lowered by the operation of cylinder 28' so as to move the inner tube 2' together with the valve stem 27' and valve member 26' thereon quickly into the plastic container to a position near the bottom thereof. Valve member 26' is then further lowered so as to open the filling valve 25' before the vent valve 5', 6' is opened due to the delay caused by the action of spring 52 upon the inner tube 2'. A predetermined quantity of the material is then passed through the filling line 49 and the filling channel between the valve stem 27' and the inner tube 2' and the opened valve 25' into the plastic container. During this filling operation, the inner tube 2' and valve stem 27' may either remain in a fixed position or they may be lifted in accordance with the rising level of the material within the plastic container. The air which is expelled from the plastic container during the filling operation then passes through the vent channel 3', and the line 11 and the throttling device 12 into the container 13 in which any material which is taken along by the discharged air is collected for further use, while the air is passed to the outside. The throttling device 12 serves for maintaining a certain pressure within the plastic container while being filled, inasmuch as this container is then still in a plastic and deformable condition.

After the plastic container has been properly filled, the piston rod 46 is slowly raised by the operation of cylinder 28. However, before piston rod 46 reaches its upper end position, at first the vent valve 5', 6' and thereafter the filling valve 25', 26' will be closed by the action of spring 52 so that there will be sufficient time for the pressure in the supply line for the material to be released. Cylinder 59 will then be operated to lift the piston rod 58 and thereby to lift the entire unit including the two tubes 1' and 2' and the valve stem 27 with the valve member 26 thereon from the filled plastic container which is thereafter closed and tightly sealed by suitable conventional means.

The check valve 65, 66 which is provided in valve member 26' and opens in the downward direction prevents the entry of any material and especially liquid material into the gas channel 18'.

The vent valve 5', 6', filling valve 25', 26', and check valve 65, 66 are all located on the free lower end of the tubular unit 1', 2', 27' also in order to prevent as much as possible any liquid material from dripping from this unit during its insertion into an unfilled container which is still in a plastic deformable condition, inasmuch as such dripping liquid might result in a premature cooling and solidification of parts of the otherwise deformable container. The lower end of this tubular unit is also specially designed so as to prevent such dripping.

Although my invention has been illustrated and described with reference to the preferred embodiment thereof, I wish to have it understood that it is in no way limited to the details of such embodiment but is capable of numerous modifications within the scope of the appended claims.

Having thus fully disclosed my invention, what I claim is:

1. Filling device for an arrangement for the production and filling of a container made of a thermoplastic synthetic substance, especially polyethylene comprising a filling tube, a closing element which, together with the lower end of the filling tube forms a valve, a first operating cylinder arranged above the filling tube, a second operating cylinder, a valve stem in and guided through the filling tube so that the valve can be closed and opened and connected with the first operating cylinder so that the latter can be lifted and lowered by means of the second operating cylinder, an outside tube provided to envelope the filling tube at least near its lower end at a distance and which forms with it a channel for a gas, said outside tube being capable to be lifted and lowered by the second operating cylinder, a stop element arranged so that the filling tube and the outside tube may be extended relative to each other, said stop element serving for the tight setting of one of the tubes onto the other as a valve, a spring, a driver attached to the valve stem between which driver and the filling tube the spring is clamped, said spring urging to lift off the filling tube from the closing element.

2. Filling device according to claim 1 in which a connecting element is provided mounted revolvably on the outside tube which has at least an annular channel between two sealing rings and which is connected with the gas channel by means of at least one transverse bore in the outside tube.

3. Filling device according to claim 1 in which the outside tube is provided with a heat insulating layer at the section adjoining its lower end.

4. Filling device according to claim 1 in which the gas channel is connected with a receiving container by means of an adjustable throttling valve, said receiving container adapted to receive filling material which may overflow from a container being filled into the gas channel.

5. Filling device according to preceding claim 1 in which the valve stem is in the form of a rod having a center bore and in which a non-return valve is provided opening to the outside at the lower end of the center bore.

6. Filling device according to claim 1 in which a compensating spring is provided mounted in a connection between the two operating cylinders and in which a spring is provided tending to hold a pressure plate shiftably within limits in the direction toward the container and against a stop.

7. A filling device as defined in claim 1 comprising at least one additional gas channel within at least one of said tubes, and means for conducting a gas through said additional gas channel into a plastic container for expanding the same and applying it against the surrounding wall of a mold.

References Cited

UNITED STATES PATENTS

| | | | |
|---|---|---|---|
| 1,706,672 | 2/1916 | Rice et al. | 141—295 X |
| 3,181,576 | 5/1965 | Pellerino et al. | 141—295 X |
| 3,196,592 | 7/1965 | Cheney | 53—140 |
| 3,311,949 | 4/1967 | Moran | 53—140 X |
| 3,328,837 | 7/1967 | Moran | 53—140 X |
| 3,016,669 | 1/1962 | Grosclaude | 53—191 |
| 3,216,176 | 11/1965 | Grosclaude et al. | 53—191 |

THERON E. CONDON, Primary Examiner

R. L. SPRUILL, Assistant Examiner

U.S. Cl. X.R.

18—5; 53—140; 141—295